US012572891B2

(12) United States Patent
Panikkar et al.

(10) Patent No.: US 12,572,891 B2
(45) Date of Patent: Mar. 10, 2026

(54) SYSTEM AND METHOD FOR OVERSTOCK RETAIL PRODUCT PROCESSING

(71) Applicant: Dell Products L.P., Round Rock, TX (US)

(72) Inventors: Shibi Panikkar, Bangalore (IN); Rohit Gosain, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 481 days.

(21) Appl. No.: 18/065,049

(22) Filed: Dec. 13, 2022

(65) Prior Publication Data

US 2024/0193536 A1     Jun. 13, 2024

(51) Int. Cl.
G06Q 10/087 (2023.01)
G06Q 10/083 (2024.01)
G06Q 30/0202 (2023.01)

(52) U.S. Cl.
CPC ......... G06Q 10/087 (2013.01); G06Q 10/083 (2013.01); G06Q 30/0202 (2013.01)

(58) Field of Classification Search
CPC .............. G06Q 10/087; G06Q 10/083; G06Q 10/06315; G06Q 30/0202
USPC ........................................................ 705/28
See application file for complete search history.

(56) References Cited

U.S. PATENT DOCUMENTS

2019/0266535 A1*  8/2019  Vann ................ G06Q 10/06315
2022/0188757 A1*  6/2022  Morris ................. G06F 18/214

OTHER PUBLICATIONS

Sleiman, Rita et al. Forecasting Sales Profiles of Products in an Exceptional Context: COVID-19 Pandemic. International Journal of Computational Intelligence Systems, 2022. (Year: 2022).*
Unknown. Intelligent Safety Stock Estimation Based on Machine Learning Methods. IP.com Journal. 2020. (Year: 2020).*

* cited by examiner

*Primary Examiner* — Fawaad Haider
(74) *Attorney, Agent, or Firm* — DALY, CROWLEY, MOFFORD & DURKEE LLP

(57) ABSTRACT

An example methodology implementing the disclosed techniques includes, by a computing device, receiving data about a probable overstock product at a retail partner in a sales region from another computing device, the data including a finished goods assembly (FGA) stock keeping unit (SKU) that identifies the probable overstock product and a corresponding quantity of the probable overstock product. The method also includes, by the computing device, determining a total quantity of the probable overstock product in the sales region, wherein the total quantity includes the quantity of the probable overstock product at the retail partner, and computing a corrected FGA demand of the probable overstock product in the sales region based on the total quantity of the probable overstock product in the sales region. The method further includes, by the computing device, the corrected FGA demand of the probable overstock product in the sales region.

14 Claims, 6 Drawing Sheets

500

Cloud Computing Environment  504

Retail Overstock Planning Service  508

Data Repository
518

API
516

Retail Overstock
Processing
520

FGA Planning
Service
522

Client  502

Retail Overstock App  506

Overstock Prediction
514

ROP Client
510

Sales
Prediction
512

600

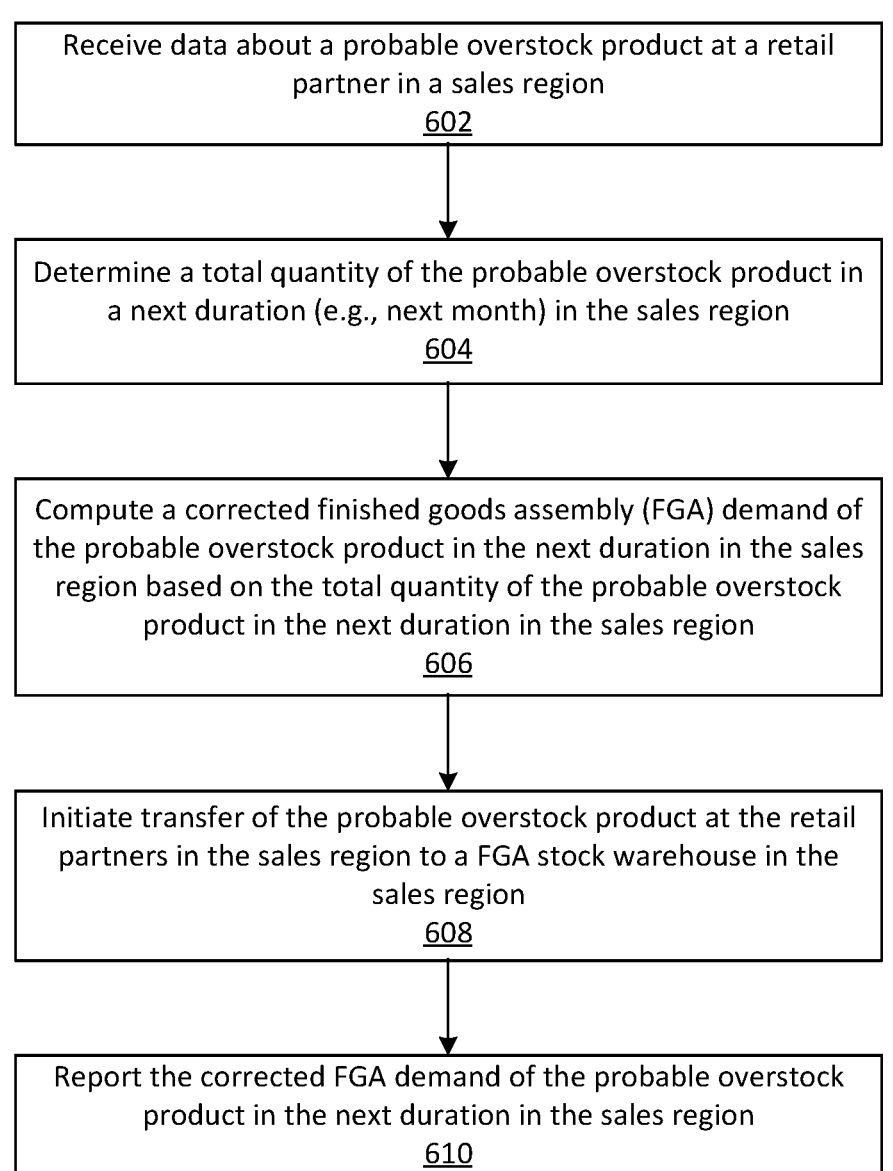

Receive data about a probable overstock product at a retail
partner in a sales region
602

Determine a total quantity of the probable overstock product in
a next duration (e.g., next month) in the sales region
604

Compute a corrected finished goods assembly (FGA) demand of
the probable overstock product in the next duration in the sales
region based on the total quantity of the probable overstock
product in the next duration in the sales region
606

Initiate transfer of the probable overstock product at the retail
partners in the sales region to a FGA stock warehouse in the
sales region
608

Report the corrected FGA demand of the probable overstock
product in the next duration in the sales region
610

FIG. 6

SYSTEM AND METHOD FOR OVERSTOCK RETAIL PRODUCT PROCESSING

BACKGROUND

Organizations, such as product manufacturers, are increasingly employing business models where their products are marketed through both retail partners and direct sales. These organizations use retail demand planning (also known as "demand planning" or "retail planning") to strategically plan for meeting retail customer demand, including resource and supply chain planning. For example, an organization using this business model may often rely on retail plans to send a portion of their finished goods assembly (FGA) demand to retail outlets according to forecasted demand.

Retail planning can be extremely difficult. Organizations utilize sales information from the retail partners to develop their retail plans. In many cases, organizations rely on third party data providers to obtain the retail sales data from the retail partners. Retail sales data obtained from these third party providers can be disorganized and inconsistent, resulting in inaccurate demand forecasts and retail plans, which can lead to issues such as understocking and overstocking of products at the retail outlets. Understocking is when a supply of a particular product fails to meet customer demand. Understocking of products can lead to lost sales due to not having sufficient quantities of products at the retail outlets. Conversely, overstocking is when quantity of a particular product exceeds customer demand. Overstocking of products can lead to costly excess inventory at the retail outlets. The retail sales data may also be in a form that is incompatible with the systems, such as retail planning systems, utilized by the organization.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one illustrative embodiment provided to illustrate the broader concepts, systems, and techniques described herein, a method includes, by a computing device, receiving data about a probable overstock product at a retail partner in a sales region from another computing device, the data including a finished goods assembly (FGA) stock keeping unit (SKU) that identifies the probable overstock product and a corresponding quantity of the probable overstock product. The method also includes, by the computing device, determining a total quantity of the probable overstock product in the sales region, wherein the total quantity includes the quantity of the probable overstock product at the retail partner, and computing a corrected FGA demand of the probable overstock product in the sales region based on the total quantity of the probable overstock product in the sales region. The method further includes, by the computing device, the corrected FGA demand of the probable overstock product in the sales region.

In some embodiments, the another computing device is deployed at a retailer site associated with the retail partner, the retailer site being in the sales region.

In some embodiments, the data about the probable overstock product is determined based on a forecast sales of products in the sales region and an inventory of products the retail partner is expected to carry in the sales region, wherein the forecast sales is determined by applying a machine learning (ML) model. In some embodiments, the inventory of the probable overstock product includes a quantity of acceptable overstock of the probable overstock product.

In some embodiments, the total quantity of the probable overstock product is in a next duration, and wherein the corrected FGA demand of the probable overstock product is in the next duration.

In some embodiments, the method further includes, by the computing device, initiating a transfer of the probable overstock product from the retail partner to an FGA stock warehouse in the sales region.

In some embodiments, the method further includes, by the computing device, initiating a transfer of the probable overstock product from the retail partner to an FGA stock warehouse in another sales region.

In some embodiments, the method further includes, by the computing device, computing a cost of shipping the quantity of the probable overstock product from the retail partner to an FGA stock warehouse and adjusting the corrected FGA demand of the probable overstock product in the sales region based on the cost of shipping the quantity of the probable overstock product from the retail partner to the FGA stock warehouse.

According to another illustrative embodiment provided to illustrate the broader concepts described herein, a system includes one or more non-transitory machine-readable mediums configured to store instructions and one or more processors configured to execute the instructions stored on the one or more non-transitory machine-readable mediums. Execution of the instructions causes the one or more processors to carry out a process corresponding to the aforementioned method or any described embodiment thereof.

According to another illustrative embodiment provided to illustrate the broader concepts described herein, a non-transitory machine-readable medium encodes instructions that when executed by one or more processors cause a process to be carried out, the process corresponding to the aforementioned method or any described embodiment thereof.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the claims appended hereto.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIG. 6 is a flow diagram of an example process for retail overstock product processing, in accordance with an embodiment of the present disclosure.

DETAILED DESCRIPTION

Figure 1:
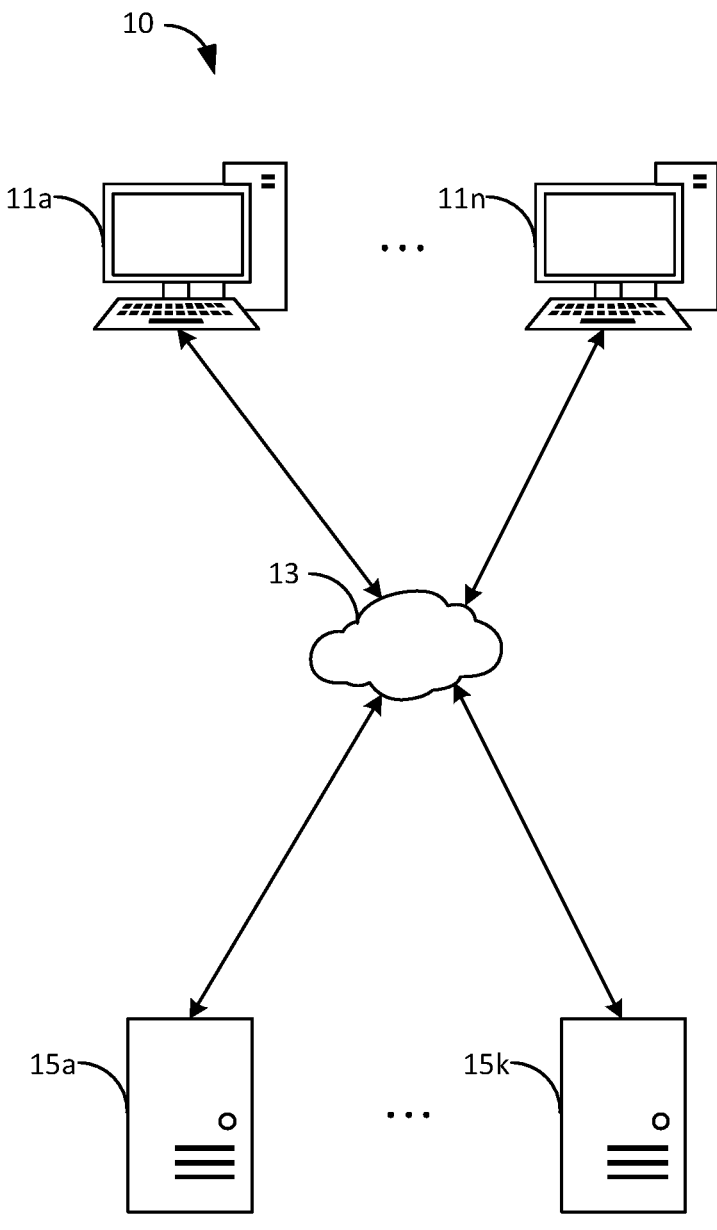
FIG. 1 is a diagram illustrating an example network environment of computing devices in which various aspects of the disclosure may be implemented, in accordance with an embodiment of the present disclosure.

Retail planning using disorganized and inconsistent retail sales information provided by third party providers can result in poor retail planning. Poor retail plans, in turn, can lead to an organization overstocking its products (or "items") at the retailers, which can be costly to the organization. Depending on the type of agreement between the organization and the retail partner (e.g., policy), the retail partner may return the surplus, overstock retail items to a product return warehouse designated by the organization. The organization will then have to properly dispose of the returned overstock retail items. In these cases, the organization may want to ship the overstock retail items to one of its finished goods stock warehouses (or "merge centers") to be used for direct sales. However, the organization may not know which of its finished goods stock warehouses to ship the overstock retail items to since its retail planning and finished goods assembly (FGA) direct sales planning are performed independent of the other. That is, the retail sales and the direct sales are forecast separately within the organization. As a result, the organization may have to dispose of the overstock retail items in another way (e.g., store the items until dismantling and disposal). In any case, such efforts in handling returned overstock retail items can be time consuming and costly to the organization.

Certain embodiments of the concepts, techniques, and structures disclosed herein generally relate to systems and methods for retail overstock product processing, and more specifically, to integrating an organization's retail planning with FGA direct sales planning to allow returned retail overstocked products to be used for direct sales. The integration is achieved by deploying clients at the various retail partners, such as, for example, BEST BUY and WALMART, among others, used by an organization for retail sales of one or more of its products. The deployed clients can accurately track incoming stock and sales of the organization's products by the retail partners, and send data about the organization's products that are probably overstocked (sometimes referred to herein as "probable overstock products") at the retail partners to a retail overstock planning platform utilized by or otherwise associated with the organization. Deploying the clients at the retail partners advantageously enables the clients to track the stock of the organization's various products at the retail partner and identify the products that are probably overstocked using the organization's FGA stock keeping units (SKUs) in the data that is sent to the retail overstock planning platform. That is, in the data sent to the retail overstock planning platform, the products that are probably overstocked are identified by the FGA SKUs used by the organization. For example, within their domain, retail partners typically use their own SKUs to identify the organization's products. In this case, the clients can map, convert, or otherwise transform the retail partner SKUs being used to identify the organization's products to the organization's FGA SKUs. In any case, the clients can identify the organization's products using the organization's FGA SKUs in the data that is sent to the retail overstock planning platform. As a result, the organization is able to readily integrate the provided data about the probable overstock products into the organization's FGA demand and direct sales planning in the sales region.

The retail overstock planning platform can consolidate the data provided by the various clients about the organization's products that are probably overstocked to determine a total quantity of the organization's products that are probably overstocked at the retail partners in the sales region. The retail overstock planning platform can revise its FGA demand of the products in a next duration (e.g., FGA demand of the products in the next month) in the sales region based on the consolidated data. For example, for a particular product that is probably overstocked in the sales region, a current FGA demand of the product in the next month in the sales region generated from the organization's conventional FGA demand planning can be revised (or "corrected") to account for the total quantity of the product that is probably overstocked in the sales region.

In some embodiments, the deployed clients can leverage a trained machine learning (ML) model to predict sales of the organization's products in the sales region. For example, training data for training the ML model can include demographic information (e.g., demographic composition in the sales region), behavioral trends (e.g., behavior trends of customers in the sales region), past transactions (e.g., past purchase trends of customers in the sales region), seasonality, and other information indicative of product inventory demands. The training data can be used to train an ML model, where the training data can configure the ML model to learn trends in the data. Once the ML model is sufficiently trained, the ML model can be used to accurately forecast sales of the organization's products by the retail partner in the sales region. That is, the trained ML model can be used to predict sales of the organization's products by the retail partner in the sales region. The predicted sales of the organization's products can be used to determine the organization's products that are probably overstocked at the retail partner. For example, the client deployed at a retail partner can determine the organization's products that are probably overstocked at the retail partner based on the predicted sales and the inventory of the products the retail partner is expected to carry in the sales region. In some embodiments, the inventory of a product the retail partner is expected to carry in the sales region can include a quantity of acceptable overstock of the product.

Referring now to FIG. 1, shown is a diagram illustrating an example network environment 10 of computing devices in which various aspects of the disclosure may be implemented, in accordance with an embodiment of the present disclosure. As shown, environment 10 includes one or more client machines 11a-11n (11 generally), one or more server machines 15a-15k (15 generally), and one or more networks 13. Client machines 11 can communicate with server machines 15 via networks 13. Generally, in accordance with client-server principles, a client machine 11 requests, via network 13, that a server machine 15 perform a computation or other function, and server machine 15 responsively fulfills the request, optionally returning a result or status indicator in a response to client machine 11 via network 13.

In some embodiments, client machines 11 can communicate with remote machines 15 via one or more intermediary appliances (not shown). The intermediary appliances may be positioned within network 13 or between networks 13. An intermediary appliance may be referred to as a network interface or gateway. In some implementations, the intermediary appliance may operate as an application delivery controller (ADC) in a datacenter to provide client machines (e.g., client machines 11) with access to business applications and other data deployed in the datacenter. The intermediary appliance may provide client machines with access to applications and other data deployed in a cloud computing environment, or delivered as Software as a Service (SaaS) across a range of client devices, and/or provide other functionality such as load balancing, etc.

Client machines 11 may be generally referred to as computing devices 11, client devices 11, client computers 11, clients 11, client nodes 11, endpoints 11, or endpoint nodes 11. Client machines 11 can include, for example, desktop computing devices, laptop computing devices, tablet computing devices, mobile computing devices, workstations, and/or hand-held computing devices. Server machines 15 may also be generally referred to a server farm 15. In some embodiments, a client machine 11 may have the capacity to function as both a client seeking access to resources provided by server machine 15 and as a server machine 15 providing access to hosted resources for other client machines 11.

Server machine 15 may be any server type such as, for example, a file server, an application server, a web server, a proxy server, a virtualization server, a deployment server, a Secure Sockets Layer Virtual Private Network (SSL VPN) server; an active directory server; a cloud server; or a server executing an application acceleration program that provides firewall functionality, application functionality, or load balancing functionality. Server machine 15 may execute, operate, or otherwise provide one or more applications. Non-limiting examples of applications that can be provided include software, a program, executable instructions, a virtual machine, a hypervisor, a web browser, a web-based client, a client-server application, a thin-client, a streaming application, a communication application, or any other set of executable instructions.

In some embodiments, server machine 15 may execute a virtual machine providing, to a user of client machine 11, access to a computing environment. In such embodiments, client machine 11 may be a virtual machine. The virtual machine may be managed by, for example, a hypervisor, a virtual machine manager (VMM), or any other hardware virtualization technique implemented within server machine 15.

Networks 13 may be configured in any combination of wired and wireless networks. Network 13 can be one or more of a local-area network (LAN), a wide area network (WAN), a metropolitan area network (MAN), a virtual private network (VPN), a primary public network, a primary private network, the Internet, or any other type of data network. In some embodiments, at least a portion of the functionality associated with network 13 can be provided by a cellular data network and/or mobile communication network to facilitate communication among mobile devices. For short range communications within a wireless local-area network (WLAN), the protocols may include 802.11, Bluetooth, and Near Field Communication (NFC).

Figure 2:
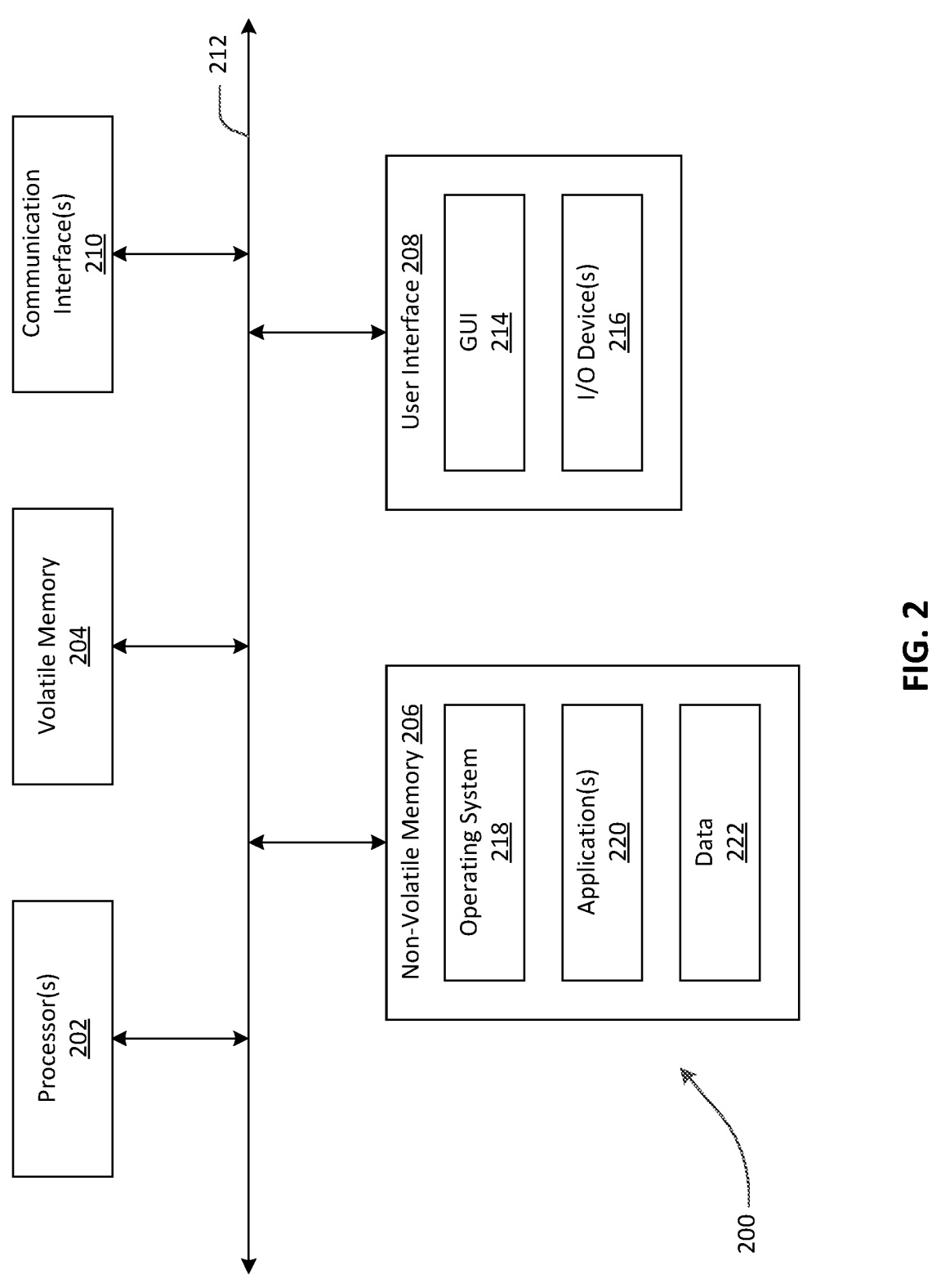
FIG. 2 is a block diagram illustrating selective components of an example computing device in which various aspects of the disclosure may be implemented, in accordance with an embodiment of the present disclosure.

FIG. 2 is a block diagram illustrating selective components of an example computing device 200 in which various aspects of the disclosure may be implemented, in accordance with an embodiment of the present disclosure. For instance, client machines 11 and/or server machines 15 of FIG. 1 can be substantially similar to computing device 200. As shown, computing device 200 includes one or more processors 202, a volatile memory 204 (e.g., random access memory (RAM)), a non-volatile memory 206, a user interface (UI) 208, one or more communications interfaces 210, and a communications bus 212.

Non-volatile memory 206 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 208 may include a graphical user interface (GUI) 214 (e.g., a touchscreen, a display, etc.) and one or more input/output (I/O) devices 216 (e.g., a mouse, a keyboard, a microphone, one or more speakers, one or more cameras, one or more biometric scanners, one or more environmental sensors, and one or more accelerometers, etc.).

Non-volatile memory 206 stores an operating system 218, one or more applications 220, and data 222 such that, for example, computer instructions of operating system 218 and/or applications 220 are executed by processor(s) 202 out of volatile memory 204. In one example, computer instructions of operating system 218 and/or applications 220 are executed by processor(s) 202 out of volatile memory 204 to perform all or part of the processes described herein (e.g., processes illustrated and described with reference to FIGS. 4 through 6). In some embodiments, volatile memory 204 may include one or more types of RAM and/or a cache memory that may offer a faster response time than a main memory. Data may be entered using an input device of GUI 214 or received from I/O device(s) 216. Various elements of computing device 200 may communicate via communications bus 212.

The illustrated computing device 200 is shown merely as an illustrative client device or server and may be implemented by any computing or processing environment with any type of machine or set of machines that may have suitable hardware and/or software capable of operating as described herein.

Processor(s) 202 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 202 may be analog, digital or mixed signal. In some embodiments, processor 202 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 210 may include one or more interfaces to enable computing device 200 to access a computer network such as a Local Area Network (LAN), a Wide Area Network (WAN), a Personal Area Network (PAN), or the Internet through a variety of wired and/or wireless connections, including cellular connections.

In described embodiments, computing device 200 may execute an application on behalf of a user of a client device. For example, computing device 200 may execute one or more virtual machines managed by a hypervisor. Each virtual machine may provide an execution session within which applications execute on behalf of a user or a client device, such as a hosted desktop session. Computing device 200 may also execute a terminal services session to provide a hosted desktop environment. Computing device 200 may provide access to a remote computing environment including one or more applications, one or more desktop applications, and one or more desktop sessions in which one or more applications may execute.

Figure 3:
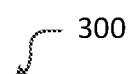
FIG. 3 is a diagram of a cloud computing environment in which various aspects of the concepts described herein may be implemented.
Figure 3:
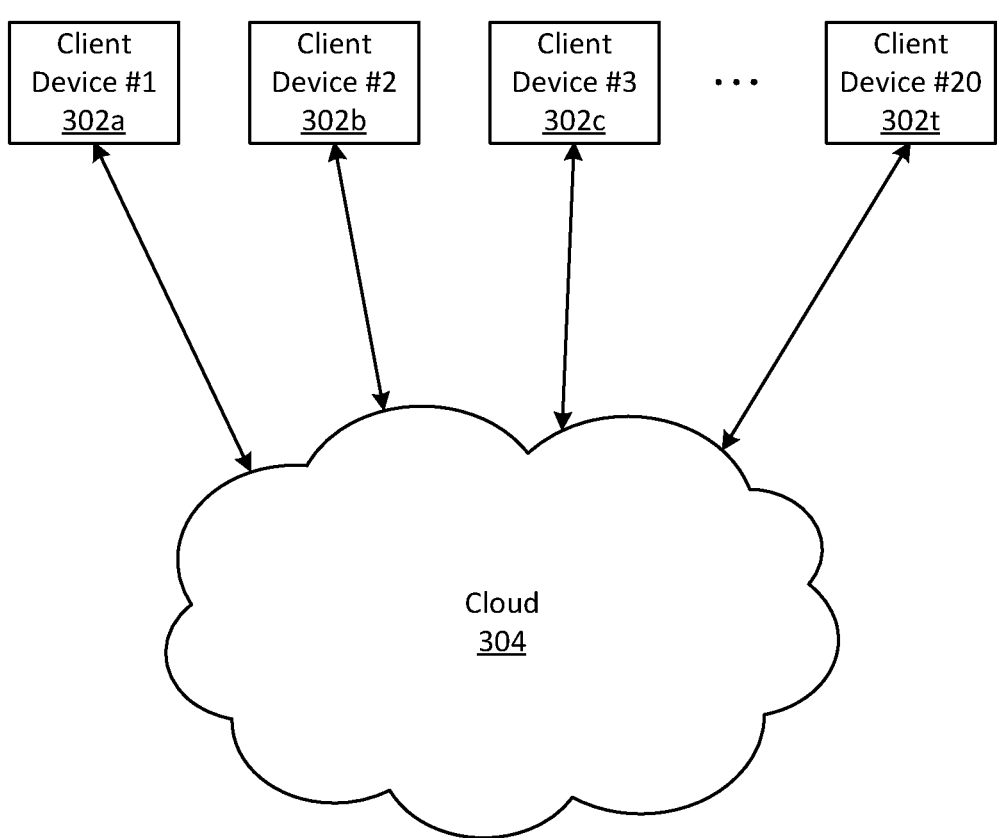

Referring to FIG. 3, shown is a diagram of a cloud computing environment 300 in which various aspects of the concepts described herein may be implemented. Cloud computing environment 300, which may also be referred to as a cloud environment, cloud computing, or cloud network, can provide the delivery of shared computing resources and/or services to one or more users or tenants. For example, the shared resources and services can include, but are not limited to, networks, network bandwidth, servers, processing, memory, storage, applications, virtual machines, databases, software, hardware, analytics, and intelligence.

In cloud computing environment 300, one or more client devices 302a-302t (such as client machines 11 and/or computing device 200 described above) may be in communication with a cloud network 304 (sometimes referred to herein more simply as a cloud 304). Cloud 304 may include back-end platforms such as, for example, servers, storage, server farms, or data centers. The users of clients 302a-302t can correspond to a single organization/tenant or multiple organizations/tenants. More particularly, in one implementation, cloud computing environment 300 may provide a private cloud serving a single organization (e.g., enterprise cloud). In other implementations, cloud computing environment 300 may provide a community or public cloud serving one or more organizations/tenants.

In some embodiments, one or more gateway appliances and/or services may be utilized to provide access to cloud computing resources and virtual sessions. For example, a gateway, implemented in hardware and/or software, may be deployed (e.g., reside) on-premises or on public clouds to provide users with secure access and single sign-on to virtual, SaaS, and web applications. As another example, a secure gateway may be deployed to protect users from web threats.

In some embodiments, cloud computing environment 300 may provide a hybrid cloud that is a combination of a public cloud and a private cloud. Public clouds may include public servers that are maintained by third parties to client devices 302a-302t or the enterprise/tenant. The servers may be located off-site in remote geographical locations or otherwise.

Cloud computing environment 300 can provide resource pooling to serve clients devices 302a-302t (e.g., users of client devices 302a-302n) through a multi-tenant environment or multi-tenant model with different physical and virtual resources dynamically assigned and reassigned responsive to different demands within the respective environment. The multi-tenant environment can include a system or architecture that can provide a single instance of software, an application, or a software application to serve multiple users. In some embodiments, cloud computing environment 300 can include or provide monitoring services to monitor, control, and/or generate reports corresponding to the provided shared resources and/or services.

In some embodiments, cloud computing environment 300 may provide cloud-based delivery of various types of cloud computing services, such as Software as a service (Saas), Platform as a Service (PaaS), Infrastructure as a Service (IaaS), and/or Desktop as a Service (DaaS), for example. IaaS may refer to a user renting the use of infrastructure resources that are needed during a specified time period. IaaS providers may offer storage, networking, servers, or virtualization resources from large pools, allowing the users to quickly scale up by accessing more resources as needed. PaaS providers may offer functionality provided by IaaS, including, e.g., storage, networking, servers, or virtualization, as well as additional resources such as, for example, operating systems, middleware, and/or runtime resources. SaaS providers may offer the resources that PaaS provides, including storage, networking, servers, virtualization, operating systems, middleware, or runtime resources. SaaS providers may also offer additional resources such as, for example, data and application resources. DaaS (also known as hosted desktop services) is a form of virtual desktop service in which virtual desktop sessions are typically delivered as a cloud service along with the applications used on the virtual desktop.

Figure 4:
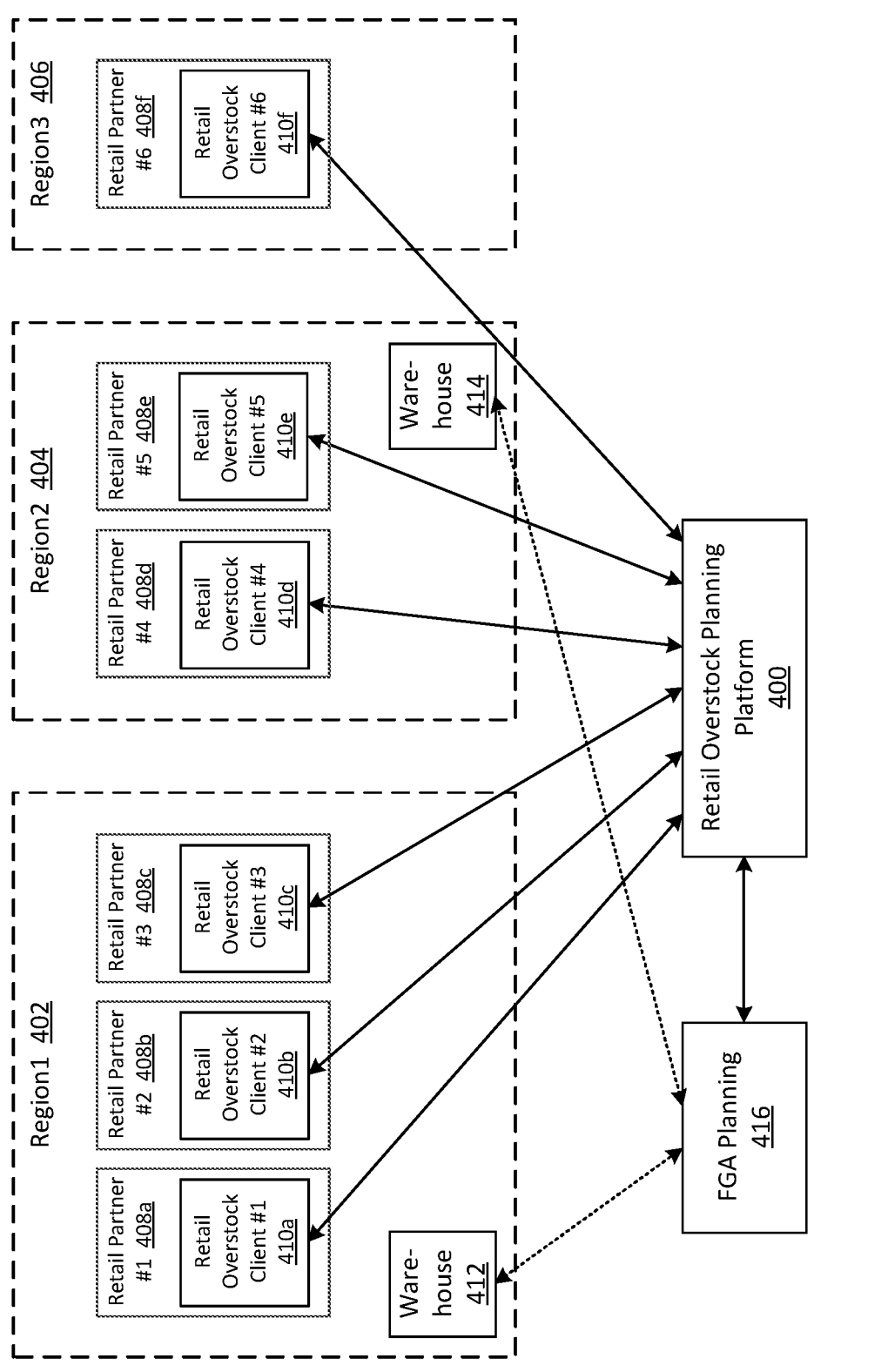
FIG. 4 is a diagram of an illustrative retail overstock product processing topology, in accordance with an embodiment of the present disclosure.

FIG. 4 is a diagram of an illustrative retail overstock product processing topology, in accordance with an embodiment of the present disclosure. Such a topology can be understood as a cyclical process in which an organization can leverage the services provided by a retail overstock planning platform 400 to integrate its retail planning with its FGA direct sales planning. In the example of FIG. 4, the organization may be conducting retail sales of one or more of its products in sales regions 402, 404, 406. More particularly, as shown in FIG. 4, the organization may be conducting retail via retail partners 408a, 408b, 408c in sales region 402, via retail partners 408d, 408e in sales region 404, and via retail partner 408f in sales region 406. Sales regions 402, 404, 406 can correspond to geographical areas in which the organization is conducting retail sales through one or more retail partners 408a-408f (408 generally). The number of sales regions 402, 404, 406 shown in FIG. 4 is merely illustrative and the structures and techniques sought to be protected herein can be applied to any number of sales regions. Also, the number of retail partners 408, and the number of retail partners 408 in each one of sales regions 402, 404, 406, shown in FIG. 4 is merely illustrative and the structures and techniques sought to be protected herein can be applied to any number of retail partners and any number of retail partners in each sales region.

In the example of FIG. 4, a retail overstock client can be deployed at or otherwise associated with each retail partner. For example, a retail overstock client 410a can be deployed at retail partner 408a, a retail overstock client 410b can be deployed at retail partner 408b, a retail overstock client 410c can be deployed at retail partner 408c, a retail overstock client 410d can be deployed at retail partner 408d, a retail overstock client 410e can be deployed at retail partner 408c, and a retail overstock client 410f can be deployed at retail partner 408f. Retail overstock clients 410a-410f (410 generally) can correspond to an application, plug-in, or other executable code that runs as a computer program on a computing device. For example, retail overstock clients 410 can run on computing devices at retailer sites, such as regional headquarters or retail distribution centers, associated with retail partners 408. Such computing devices may be configured to communicate with retail overstock planning platform 400 via one or more computer networks (e.g., via the Internet).

The individual retail overstock clients 410 can provide data about the organization's products that are probably overstocked at the respective retail partners 408 to retail overstock planning platform 400. Retail overstock clients 410 can leverage a trained ML model, such as a trained ML model configured to predict (or "forecast") sales, to determine the organization's products that are probably overstocked at the respective retail partners 408. In the example of FIG. 4, retail overstock client 410a can provide data about the organization's products that are probably overstocked at retail partner 408a in sales region 402, retail overstock client 410b can provide data about the organization's products that are probably overstocked at retail partner 408b in sales region 402, retail overstock client 410c can provide data about the organization's products that are probably overstocked at retail partner 408c in sales region 402, retail overstock client 410d can provide data about the organization's products that are probably overstocked at retail partner 408d in sales region 404, retail overstock client 410e can provide data about the organization's products that are probably overstocked at retail partner 408e in sales region 404, and retail overstock client 410f can provide data about the organization's products that are probably overstocked at retail partner 408f in sales region 406. Retail overstock clients 410 can identify the products that are probably overstocked using the organization's FGA SKUs in the data provided to retail overstock planning platform 400. Retail overstock clients 410 can be configured to provide such data to retail overstock planning platform 400 on a periodic basis, such as, for example, weekly, monthly, quarterly, or other suitable period.

Retail overstock planning platform 400 can leverage the data provided by retail overstock clients 410 to revise the organization's FGA demand of the probable overstock products in a next duration (e.g., next month, next quarter, etc.) in one or more sales regions. This can be accomplished, for example, by consolidating the data provided by the retail overstock clients (e.g., each retail partner) in each sales region to determine a total quantity of each of the probably overstocked products in the next duration in each of the sales regions (i.e., determine a total quantity of each of the probable overstock products in each of the sales regions). In the example of FIG. 4, retail overstock planning platform 400 can consolidate the data provided by retail overstock clients 410a, 410b, 410c to determine a total quantity of each of the organization's products that are probably overstocked in the next duration in sales region 402. For example, suppose the data provided by retail overstock client 410a indicates that a quantity of 300 units of Product A, a quantity of 200 units of Product B, and a quantity of 350 units of Product C are probably overstocked at retail partner 408a, the data provided by retail overstock client 410b indicates that a quantity of 200 units of Product A and a quantity of 400 units of Product B are probably overstocked at retail partner 408b, and the data provided by retail overstock client 410c indicates that a quantity of 500 units of Product B and a quantity of 600 units of Product C are probably overstocked at retail partner 408b. In this case, retail overstock planning platform 400 can consolidate the data from retail overstock clients 410a, 410b, 410c and determine that a total quantity of 500 units of Product A (300+200=500), a total quantity of 1,100 units of Product B (200+400+500=1,100), and a total quantity of 950 units of Product C (350+600=950) are probably overstocked in the next duration in sales region 402. Retail overstock planning platform 400 can then compute a corrected FGA demand of the various products that are probably overstocked (i.e., a corrected FGA demand of each of the probable overstock products) based on the total quantities of the various products that are probably overstocked. In more detail, retail overstock planning platform 400 can compute a corrected FGA demand of a product in a next duration as follows:

$$\text{Corrected FGA demand of } n \text{ in } m = \text{current FGA demand of } n \text{ in } m - \text{overstock of } m \text{ in } n.$$

where n is a product and m is a sales region.

Continuing the above example, suppose the FGA demand of Product A in the next quarter in sales region 402 is 10,000 units, the FGA demand of Product B in the next duration in sales region 402 is 9,000 units, and the FGA demand of Product C in the next duration in sales region 402 is 10,000 units. In this case, retail overstock planning platform 400 can compute a corrected FGA demand of Product A in the next quarter in sales region 402 to be 9,500 units (10,000–500=9,500), a corrected FGA demand of Product B in the next quarter in sales region 402 to be 7,900 units (9,000–1,100=7,900), and a corrected FGA demand of Product C in the next quarter in sales region 402 to be 9,050 units (10,000–950=9,050). Retail overstock planning platform 400 can similarly compute a corrected FGA demand of the various products that are probably overstocked in each of sales regions 404, 406 in a manner similar to that previously described herein for sales region 402.

In some embodiments, retail overstock planning platform 400 can cause the transfer of the probable overstock products at a retail partner to a designated FGA stock warehouse of the organization. The designated FGA stock warehouse may be in the same sales region as the retail partner. As shown in FIG. 4, a warehouse 412 can correspond to the organization's FGA stock warehouse in sales region 402 and a warehouse 414 can correspond to the organization's FGA stock warehouse in sales region 404, and the organization may not have an FGA stock warehouse located in sales region 406. Continuing the above example, retail overstock planning platform 400 can send a message to retail overstock client 410a that causes retail overstock client 410a to initiate the transfer of the probable overstock products at retail partner 408a (e.g., 300 units of Product A, 200 units of Product B, and 350 units of Product C) to warehouse 412 in sales region 402. Retail overstock planning platform 400 can send a message to retail overstock client 410b that causes retail overstock client 410b to initiate the transfer of the probable overstock products at retail partner 408b (e.g., 200 units of Product A and 400 units of Product B) to warehouse 412, and a message to retail overstock client 410c that causes retail overstock client 410c to initiate the transfer of the probable overstock products at retail partner 408c (e.g., 500 units of Product B and 600 units of Product C) to warehouse 412. In some cases, the designated FGA stock warehouse may be in a different sales region from the retail partner. For example, if the organization does not have an FGA stock warehouse in the same sales region as a retail partner, the probable overstock products at the retail partner may be transferred to an FGA stock warehouse in a different sales region. For instance, in the example of FIG. 4, retail overstock planning platform 400 can send a message to retail overstock client 410*f* that causes retail overstock client 410*f* to initiate the transfer of the probable overstock products at retail partner 408*f* to warehouse 412 in sales region 402.

In some embodiments, retail overstock planning platform 400 can send a message to the organization's FGA manufacturing and product movement planning system(s) informing of the revised FGA demand of the products in the various sales regions. Continuing the above example, retail overstock planning platform 400 can send a message to an FGA planning system 416 informing of the corrected FGA demand of 9,500 units of Product A in the next quarter in sales region 402, a corrected FGA demand of 7,900 units of Product B in the next quarter in sales region 402, and a corrected FGA demand of 9,050 units of Product C in the next quarter in sales region 402. In response, the organization's FGA manufacturing and product movement planning system (e.g., FGA planning system 416) can appropriately adjust the FGA demand and/or manufacturing of Product A, Product B, and Product C in the next quarter in sales region 402.

Figure 5:
FIG. 5 is a block diagram of an illustrative system for retail overstock product processing, in accordance with an embodiment of the present disclosure.

FIG. 5 is a block diagram of an illustrative system 500 for retail overstock product processing, in accordance with an embodiment of the present disclosure. Illustrative system 500 includes a retail overstock application 506 installed and/or running on a client device 502 and configured to communicate with a cloud computing environment 504 via one or more computer networks. Client device 502 and cloud computing environment 504 of FIG. 5 can be the same as or similar to client 11 of FIG. 1 and cloud computing environment 300 of FIG. 3, respectively.

As shown in FIG. 5, a retail overstock planning service 508 can be provided as a service (e.g., a microservice) within cloud computing environment 504. Retail overstock application 506 and retail overstock planning service 508 can interoperate to provide integration of an organization's retail planning with FGA direct sales planning, as variously disclosed herein. In some embodiments, retail overstock application 512 can be the same or similar to any or all of retail overstock clients 410*a* of FIG. 4 and retail overstock planning service 508 can be the same or similar to retail overstock planning platform 400 of FIG. 4.

To promote clarity in the drawings, FIG. 5 shows a single retail overstock application 506 communicably coupled to retail overstock planning service 508. However, embodiments of retail overstock planning service 508 can be used to service many client applications (e.g., retail overstock applications 506) installed and/or running on clients (e.g., client devices 502) associated with one or more organizations and/or retail partners associated with the organization. Retail overstock application 506 and/or retail overstock planning service 508 may be implemented as computer instructions executable to perform the corresponding functions disclosed herein.

Retail overstock application 506 and retail overstock planning service 508 can be logically and/or physically organized into one or more components. In the example of FIG. 4, retail overstock application 506 includes a retail overstock planning (ROP) client 510, a sales prediction module 512, and an overstock prediction module 514. Also, in this example, retail overstock planning service 508 includes an application programming interface (API) module 516, a data repository 518, and a retail overstock processing module 520.

The client-side retail overstock application 506 can communicate with the cloud-side retail overstock planning service 508 using an API. For example, retail overstock application 506 can utilize ROP client 510 to send requests (or "messages") to retail overstock planning service 508 wherein the requests are received and processed by API module 516 or one or more other components of retail overstock planning service 508. Likewise, retail overstock planning service 508 can utilize API module 516 to send responses/messages to retail overstock application 506 wherein the responses/messages are received and processed by ROP client 510 or one or more other components of retail overstock application 506.

Referring to retail overstock application 506, sales prediction module 512 is operable to predict sales of the organization's products in a sales region. The prediction may be of retail sales of the organization's products in a sales region by a retail partner used by or otherwise associated with the organization. In some embodiments, for a particular product being sold by the organization, sales prediction module 512 can predict a quantity of the product that is likely to sell in the sales region in a next period, e.g., next week, next month, next quarter, or next year. The sales prediction can be based on various factors such as historical sales data, competitive landscape, product changes, and seasonality, among others.

In some embodiments, sales prediction module 512 can predict sales of the organization's products in a sales region on a continuous or periodic basis (e.g., according to a predetermined schedule specified by the organization). For example, sales prediction module 512 can predict sales of the organization's products daily, weekly, bi-weekly, monthly, or other suitable execution period. The period for predicting sales of the organization's products may be configured as part of an organizational policy.

In some embodiments, sales prediction module 512 can include or implement an ML model (e.g., linear regression model, random forest regression model, long short-term memory (LSTM) artificial neural network (ANN), autoregressive integrated moving average (ARIMA) time series forecasting model, and the like). The ML model of sales prediction module 512 can be trained using machine learning techniques with training data composed of demographic information (e.g., demographic composition in a sales region), behavioral trends (e.g., behavior trends of customers in a sales region), past transactions (e.g., past purchase trends of customers in a sales region), seasonality, and other information indicative of product inventory demands. The training can configure the ML model to learn trends in the training data. Once the ML model is sufficiently trained, the ML model can be used to accurately forecast sales of the organization's products by a retail partner in a sales region. For example, if sales prediction module 512 is running on a client deployed at a retail partner ACME in a western sales region, the trained ML model can be used to accurately forecast sales of the organization's products by retail partner ACME in the western sales region.

In some embodiments, the ML model of sales prediction module 512 can be retrained with updated training data. For example, the training data or portions of the training data can be updated to include new or recent behavioral trends, transaction data, seasonality data, and/or other training data that have otherwise not been previously used to train the ML model.

Overstock prediction module 514 is operable to determine the organization's products that are probably overstocked at a retail partner. Such determination by overstock prediction module 514 can be on a per product basis. In some embodiments, overstock prediction module 514 can use forecast sales of the organization's products in a sales region generated by sales prediction module 512 along with the inventory of the organization's products the retail partner is expected to carry in the sales region to determine the organization's products that are probably overstocked at the retail partner in the sales region. For example, suppose sales prediction module 512 forecast sales of 1,000 of the organization's widgets by a retail partner ABC in a southern sales region in the next month. Also suppose that retail partner ABC is expected to carry an inventory of 1,500 of the organization's widgets in the southern sales region in the next month. In this case, overstock prediction module 514 can determine that 500 of the organization's widgets (1,500−1,000=500) are probably overstocked at retail partner ABC in the southern sales region in the next month.

In some embodiments, overstock prediction module 514 can allow for acceptable overstock of products in the inventory in determining the organization's products that are probably overstocked at a retail partner. Continuing the above retail partner ABC example, suppose that retail partner ABC carries 100 of the organization's widgets as acceptable overstock in the southern sales region. In this case, overstock prediction module 514 can determine that 400 of the organization's widgets (1,500−(1,000+100)=400) are probably overstocked at retail partner ABC in the southern sales region in the next month.

In some embodiments, overstock prediction module 514 can determine the organization's products that are probably overstocked at a retail partner in a sales region on a continuous or periodic basis (e.g., according to a predetermined schedule specified by the organization). Additionally or alternatively, overstock prediction module 514 can determine the organization's products that are probably overstocked at a retail partner in a sales region in response to an input. For example, when sales prediction module 512 predicts sales of the organization's products in the sales region, sales prediction module 512 can send a message to overstock prediction module 514 that causes overstock prediction module 514 to determine the organization's products that are probably overstocked at the retail partner in the sales region.

Overstock prediction module 514 can send data about the organization's products that are probably overstocked at the retail partner to retail overstock planning service 508 causing retail overstock planning service 508 to store the data within data repository 518. In some embodiments, data repository 518 may correspond to a storage service within the computing environment of retail overstock planning service 508. For example, for a particular product that is probably overstocked, such data can include a unique identifier which identifies the probable overstock product and an indication of a quantity of the probable overstock product. In some embodiments, the probable overstocked products (i.e., the products that are probably overstocked) can be identified using the organization's FGA SKUs. Overstock prediction module 514 can send such data to retail overstock planning service 508 on a continuous or periodic basis (e.g., according to a predetermined schedule specified by the organization). For example, overstock prediction module 514 can send such data to retail overstock planning service 508 weekly, monthly, quarterly, or other suitable period. The period for sending the data to retail overstock planning service 508 may be configured as part of an organizational policy.

Referring to retail overstock planning service 508, retail overstock processing module 520 can utilize the data about the organization's products that are probably overstocked from the various retail overstock applications 506 at the organization's retail partners to revise an FGA demand of the organization's probable overstock products. In some embodiments, retail overstock processing module 520 can revise the FGA demand of the organization's probable overstock products in a next duration, such as, for example, next month, next quarter, etc. Additionally, the revision may be of the FGA demand of the organization's probable overstock products in a sales region. That is, the revision of the FGA demand of the organization's probable overstock products may be on a per sales region basis. As a result, the data about the organization's probable overstock products is integrated with the organization's FGA direct sales planning. As an example, suppose that the data about the products that are probably overstocked indicates a laptop as a probable overstock product. Also suppose that the revision is of the FGA demand of laptops in the next month in a central sales region. In this case, retail overstock processing module 520 can retrieve from data repository 518 the data about the probable overstock product provided by the retail partners (e.g., sent by overstock prediction modules 514 running at the retail partners) in the central region. From the retrieved data, retail overstock processing module 520 can consolidate the quantities of laptops that are probably overstocked in the next month at each of the each of the retail partners to determine a total quantity of laptops that are probably overstocked in the next month in the central sales region. Retail overstock processing module 520 can revise the FGA demand of laptops in the next month in the central sales region based on the total quantity of laptops that are probably overstocked in the next month in the central sales region. For example, as previously described, retail overstock processing module 520 can compute a corrected FGA demand of laptops in the next month in the central sales region as the difference of a current FGA demand of laptops in the next month in the central sales region and the determined total quantity of laptops that are probably overstocked in the next month in the central sales region. As shown in FIG. 5, retail overstock processing module 520 can, in some embodiments, obtain the current FGA demand of laptops in the next month in the central sales region from an FGA planning service 522 that can correspond to, for example, an FGA planning system (e.g., FGA planning system 416 of FIG. 4) utilized by or associated with the organization.

In some embodiments, retail overstock processing module 520 can send a message to FGA planning service 522 informing of the revised FGA demand of the organization's products in the various sales regions. Continuing the above laptop example, retail overstock processing module 520 can send a message to FGA planning service 522 informing of the corrected FGA demand of the organization's laptops in the next month in the central sales region. This allows FGA planning service 522 to appropriately adjust the FGA demand and/or manufacturing of laptops for the next month in the central sales region.

In some embodiments, retail overstock processing module 520 can revise the FGA demand of the organization's probable overstock products on a continuous or periodic basis (e.g., according to a predetermined schedule specified by the organization). The period for revising the FGA demand of the organization's probable overstock products may be configured as part of an organizational policy. Additionally or alternatively, retail overstock processing module 520 can revise the FGA demand of the organization's probable overstock products in response to an input. For example, retail overstock processing module 520 can provide a user interface control/element that an authorized user may click/tap to request revision of the FGA demand of the organization's probable overstock products (e.g., cause retail overstock processing module 520 to revise the FGA demand of the organization's products). In some implementations, retail overstock processing module 520 can provide user interface controls/elements for inputting or otherwise specifying a probable overstock product whose FGS demand is to be revised, specifying a sales region, and/or a next duration for revising the FGA demand. In response to the inputs, retail overstock processing module 520 can revise the FGA demand of the specified product in the specified next duration in the specified sales region.

In some embodiments, retail overstock processing module 520 can cause the transfer of the probable overstock products at a retail partner to a designated FGA stock warehouse of the organization. The designated FGA stock warehouse may be in the same sales region or in a different sales region as the retail partner. Continuing the above laptop example, suppose all the retail partners in the central sales region have overstock of the organization's laptops. Also suppose that the organization has an FGA stock warehouse located in the central sales region. In this case, retail overstock processing module 520 can send a message to each retail overstock application 506 at the retail partners in the central sales region that causes retail overstock applications 506 to initiate transfer of the overstocked laptops at the retail partners to the FGA stock warehouse in the central sales region.

In some embodiments, retail overstock processing module 520 can report the corrected FGA demand of the organization's products in the various sales regions. For example, in one implementation, retail overstock processing module 520 can report a corrected FGA demand of a product in a next duration in a sales region via a user interface (e.g., user interface controls/elements) that enables a user, such as an FGA demand planning team member or other authorized user within or associated with the organization, to access the revised FGA demand information. In some implementations, retail overstock processing module 520 can provide user interface controls/elements that enable users to interact with the revised FGA demand information. For example, a user can review the revised FGA demand information and confirm or refuse the revision to the FGA demand. As another example, a user can review the revised FGA demand information and confirm or otherwise authorize transfer of probable overstock products from a retail partner to an FGA stock warehouse.

In some embodiments, retail overstock processing module 520 can adjust the corrected FGA demand of a probable overstock product in a next duration in a sales region based on costs to transfer the probable overstock product from the retail partners in the sales region to an FGA stock warehouse. In more detail, retail overstock processing module 520 can determine whether the probable overstock products should be integrated into the organization's FGA direct sales in a next duration (i.e., determine whether to adjust the corrected FGA demand of the probable overstock product in a next duration) based on the costs to transfer the probable overstock product to an FGA stock warehouse and a threshold cost percentage. The threshold cost percentage may be configurable as part of an organizational policy. For example, the policy may specify that a probable overstock product is to be returned for FGA direct sales if the cost of shipping the probable overstock product to the FGA stock warehouse is less than a threshold percentage (e.g., 75%, 80%, 90%, etc.) of the cost of manufacturing the product (e.g., cost of manufacturing a new product). In this case, if the cost of shipping a probable overstock product is less than the specified threshold percentage of the cost of manufacturing a new product, retail overstock processing module 520 can determine to ship the probable overstock product from the retail partners having the probable overstock product to the FGA stock warehouse. Otherwise, if the cost of shipping the probable overstock product is not less than the specified threshold percentage of the cost of manufacturing a new product, retail overstock processing module 520 can determine to not ship the probable overstock product to the FGA stock warehouse (e.g., decide to not use the overstocked products for direct sales). In any case, retail overstock processing module 520 can adjust the corrected FGA demand of a probable overstock product in a next duration in a sales region based on the determination to integrate or not integrate the probable overstock product in the sales region into the organization's FGA direct sales.

Continuing the above laptop example, suppose the cost of shipping an overstocked laptop from the retail partner to the FGA stock warehouse is $10.00. Also suppose that the cost of manufacturing a new laptop is $20.00 and the threshold percentage specified in the organizational policy is 80%. In this case, retail overstock processing module 520 can determine to integrate the overstocked laptops into the organization's FGA direct sales since the cost of shipping an overstock laptop to the FGA stock warehouse ($10.00) is less than the specified threshold percentage of the cost of manufacturing a new laptop ($20.00×0.80=$16.00). Since the determination is to integrate the overstocked laptops into the organization's FGA direct sales, retail overstock processing module 520 does not adjust the corrected FGA demand of the organization's laptops. That is, the corrected FGA demand of the organization's laptops is not adjusted since the corrected FGA demand of the organization's laptops accounted for all the overstocked laptops to be returned to the FGA stock warehouse to be used for direct sales.

In some embodiments, retail overstock processing module 520 can adjust the corrected FGA demand of a probable overstock product in a next duration in a sales region based on user input. For example, retail overstock processing module 520 can provide the cost to ship the probable overstock product from a retail partner to an FGA stock warehouse via a user interface or other means, such as a report, for analysis and decision as to whether the probable overstock product should be integrated into the organization's FGA direct sales (e.g., used for direct sales). Retail overstock processing module 520 can provide user interface controls/elements that enable an authorized user within or associated with the organization to input a decision as to whether or not the cost to ship the probable overstock product is acceptable (e.g., input a decision as to whether the probable overstock products are to be integrated into the organization's FGA direct sales).

FIG. 6 is a flow diagram of an example process 600 for retail overstock product processing, in accordance with an embodiment of the present disclosure. Illustrative process 600 may be implemented, for example, within system 500 of FIG. 5. In more detail, process 600 may be performed, for example, in whole or in part by sales prediction module 512, overstock prediction module 514, retail overstock processing module 520, or any combination of these including other components of system 500 described with respect to FIG. 5.

With reference to process 600 of FIG. 6, at 602, data about a probable overstock product at a retail partner in a sales region may be received. Such data may be received from the retail partners in the sales region having the probable overstock product. For example, the received data can identify the probable overstock product by the organization's FGA SKU and indicate a quantity of the probable overstock product at the retail partner. In the case where the retail partner does not have any of the probable overstock product, the data from the retail partner can indicate a quantity of zero (i.e., "0"). Such data about probable overstock products may be periodically received (e.g., received weekly) from the retail partners in the sales region.

At 604, a total quantity of the probable overstock product in a next duration (e.g., next month) in the sales region may be determined. The total quantity of the probable overstock product in the next duration can be determined from the data received at 602.

At 606, a corrected FGA demand of the probable overstock product in the next duration may be computed. The corrected FGA demand of the probable overstock product in the next duration can be computed based on the total quantity of the probable overstock product in the next duration determined at 604. For example, the corrected FGA demand of the probable overstock product in the next duration in the sales region can be computed as the difference of a current FGA demand of the probable overstock product in the next duration in the sales region and the total quantity of the probable overstock product in the next duration in the sales region.

At 608, a transfer of the probable overstock product at the retail partners in the sales region to an FGA stock warehouse in the sales region may be initiated. For example, a message can be sent to each retail partner in the sales region having quantities of the probable overstock product that causes the transfer (e.g., shipping) of the quantities of the probable overstock product at the retail partner to the FGA stock warehouse. In some cases, the transfer of the probable overstock product may be to an FGA stock warehouse that is located in a different sales region.

At 610, the corrected FGA demand of the probable overstock product in the next duration in the sales region may be reported. For example, a message informing of the corrected FGA demand can be sent to the organization's FGA planning service (e.g., FGA planning service 522).

In some embodiments, additional operations may be performed. For example, in one embodiment, the costs to transfer (e.g., ship) the probable overstock product at the retail partners to the FGA stock warehouse may be determined. The corrected FGA demand of the probable overstock product in the next duration in the sales region may then be adjusted based on the costs to transfer the probable overstock product to the FGA stock warehouse. For example, if the costs to transfer the probable overstock product to the FGA stock warehouse is not acceptable, then a determination can be made to not transfer the probable overstock product at the retail partners to the FGA stock warehouse. In this case, the corrected FGA demand of the probable overstock product in the next duration in the sales region may be adjusted to account for the probable overstock product not being transferred to the FGA stock warehouse (e.g., to account for the decision to not use the probable overstock product for direct sales).

In the foregoing detailed description, various features of embodiments are grouped together for the purpose of streamlining the disclosure. This method of disclosure is not to be interpreted as reflecting an intention that the claims require more features than are expressly recited. Rather, inventive aspects may lie in less than all features of each disclosed embodiment.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Elements of different embodiments described herein may be combined to form other embodiments not specifically set forth above. Other embodiments not specifically described herein are also within the scope of the following claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the scope of the present disclosure. Accordingly, it is intended that the scope of the present disclosure be limited not by this detailed description, but rather by the claims appended hereto.

What is claimed is:

1. A method comprising:

deploying, by a computing device, a retail overstock client to a client device at a retailer site associated with a retail partner in a sales region, the retail overstock client comprising a machine learning (ML) model continuously trained on region-specific training data including demographic composition data, customer behavioral trend data, past purchase transaction data, and seasonality data to predict a sales forecast of a product using a training dataset including historical information indicative of product inventory demand;

instructing, by the computing device, the retail overstock client to generate a sales forecast from the ML model for a product by mapping retailer-specific SKUs identifying the product at the retailer site to corresponding manufacturer FGA SKUS;

receiving, by the computing device, inventory and sales data about a product at the retail partner in the sales region from the client device, the inventory and sales data including a sales forecast of the product in the sales region, an inventory of the product the retail partner is expected to carry in the sales region, a finished goods assembly (FGA) stock keeping unit (SKU) identifying the product and a corresponding quantity of the product, wherein the inventory of the product includes a quantity of acceptable overstock of the product and wherein the inventory and sales data is transformed from inconsistent third-party retailer formats into a unified PGA-compatible format via the SKU mapping performed by the retail overstock client;

identifying the product as a probable overstock product based on the inventory and sales data, wherein the probable overstock product is indicative of an excess quantity of the product exceeding the predicted sales forecast by a threshold amount determined via the ML model;

determining, by the computing device, a total quantity of the probable overstock product in the sales region, wherein the total quantity includes the quantity of the probable overstock product at the retail partner and is aggregated from SKU-mapped data across multiple retail overstock clients deployed at a plurality of retailer sites in the sales region;

computing, by the computing device, a corrected FGA demand of the probable overstock product in the sales region based on the total quantity of the probable overstock product in the sales region;

computing, by the computing device, a cost of shipping the quantity of the probable overstock product from the retail partner to an FGA stock warehouse;

adjusting, by the computing device, the corrected FGA demand of the probable overstock product in the sales region based on the cost of shipping the quantity of the probable overstock product from the retail partner to the FGA stock warehouse; and reporting, by the computing device, the adjusted corrected FGA demand of the probable overstock product in the sales region to integrate the corrected FGA demand into a direct sales planning system for automated resource allocation across the sales region.

2. The method of claim 1, wherein the another computing device is deployed at a retailer site associated with the retail partner, the retailer site being in the sales region.

3. The method of claim 1, wherein the total quantity of the probable overstock product is in a next duration, and wherein the corrected FGA demand of the probable overstock product is in the next duration.

4. The method of claim 1, further comprising, by the computing device, initiating a transfer of the probable overstock product from the retail partner to an FGA stock warehouse in the sales region.

5. The method of claim 1, further comprising, by the computing device, initiating a transfer of the probable overstock product from the retail partner to an FGA stock warehouse in another sales region.

6. The method of claim 1 wherein the ML model is one of a linear regression model, a random forest regression model, a long short-term memory (LSTM) artificial neural network (ANN), and an autoregressive integrated moving average (ARIMA) time series forecasting model.

7. The method of claim 1 wherein the historical information indicative of product inventory demand comprises one or more of demographic information, behavioral trends, past transactions and seasonality.

8. A computing device comprising:

one or more non-transitory machine-readable mediums configured to store instructions; and one or more processors configured to execute the instructions stored on the one or more non-transitory machine-readable mediums, wherein execution of the instructions causes the one or more processors to carry out a process comprising:

deploying a retail overstock client to a client device at a retailer site associated with a retail partner in a sales region, the retail overstock client comprising a machine learning (ML) model continuously trained on region-specific training data including demographic composition data, customer behavioral trend data, past purchase transaction data, and seasonality data to predict a sales forecast of a product using a training dataset including historical information indicative of product inventory demand;

instructing the retail overstock client to generate a sales forecast from the ML model for a product by mapping retailer-specific SKUs identifying the product at the retailer site to corresponding manufacturer FGA SKUS;

receiving inventory and sales data about a product at the retail partner in the sales region from the client device, the inventory and sales data including a sales forecast of the product in the sales region, an inventory of the product the retail partner is expected to carry in the sales region, a finished goods assembly (FGA) stock keeping unit (SKU) identifying the product and a corresponding quantity of the product, wherein the inventory of the product includes a quantity of acceptable overstock of the product and wherein the inventory and sales data is transformed from inconsistent third-party retailer formats into a unified FGA-compatible format via the SKU mapping performed by the retail overstock client;

identifying the product as a probable overstock product based on the inventory and sales data, wherein the probable overstock product is indicative of an excess quantity of the product exceeding the predicted sales forecast by a threshold amount determined via the ML model;

determining a total quantity of the probable overstock product in the sales region, wherein the total quantity includes the quantity of the probable overstock product at the retail partner and is aggregated from SKU-mapped data across multiple retail overstock clients deployed at a plurality of retailer sites in the sales region;

computing a corrected FGA demand of the probable overstock product in the sales region based on the total quantity of the probable overstock product in the sales region;

computing a cost of shipping the quantity of the probable overstock product from the retail partner to an FGA stock warehouse;

adjusting the corrected FGA demand of the probable overstock product in the sales region based on the cost of shipping the quantity of the probable overstock product from the retail partner to the FGA stock warehouse; and reporting the adjusted corrected FGA demand of the probable overstock product in the sales region: to integrate the corrected FGA demand into a direct sales planning system for automated resource allocation across the sales region.

9. The computing device of claim 8, wherein the another computing device is deployed at a retailer site associated with the retail partner, the retailer site being in the sales region.

10. The computing device of claim 8, wherein the total quantity of the probable overstock product is in a next duration, and wherein the corrected FGA demand of the probable overstock product is in the next duration.

11. The computing device of claim 8, wherein the process further comprises initiating a transfer of the probable overstock product from the retail partner to an FGA stock warehouse in the sales region.

12. A non-transitory machine-readable medium encoding instructions that when executed by one or more processors cause a process to be carried out, the process including:

deploying a retail overstock client to a client device at a retailer site associated with a retail partner in a sales region, the retail overstock client comprising a machine learning (ML) model continuously trained on region-specific training data including demographic composition data, customer behavioral trend data, past purchase transaction data, and seasonality data to predict a sales forecast of a product using a training dataset including historical information indicative of product inventory demand;

instructing the retail overstock client to generate a sales forecast from the ML model for a product by mapping retailer-specific SKUs identifying the product at the retailer site to corresponding manufacturer FGA SKUs;

receiving inventory and sales data about a product at the retail partner in the sales region from the client device, the inventory and sales data including a sales forecast of the product in the sales region, an inventory of the product the retail partner is expected to carry in the sales region, a finished goods assembly (FGA) stock keeping unit (SKU) identifying the product and a corresponding quantity of the product, wherein the inventory of the product includes a quantity of acceptable overstock of the product and wherein the inventory and sales data is transformed from inconsistent third-party retailer formats into a unified FGA-compatible format via the SKU mapping performed by the retail overstock client;

identifying the product as a probable overstock product based on the inventory and sales data, wherein the probable overstock product is indicative of an excess quantity of the product exceeding the predicted sales forecast by a threshold amount determined via the ML model;

determining a total quantity of the probable overstock product in the sales region, wherein the total quantity includes the quantity of the probable overstock product at the retail partner and is aggregated from SKU-mapped data across multiple retail overstock clients deployed at a plurality of retailer sites in the sales region;

computing a corrected FGA demand of the probable overstock product in the sales region based on the total quantity of the probable overstock product in the sales region;

computing a cost of shipping the quantity of the probable overstock product from the retail partner to an FGA stock warehouse;

adjusting the corrected FGA demand of the probable overstock product in the sales region based on the cost of shipping the quantity of the probable overstock product from the retail partner to the FGA stock warehouse; and reporting the adjusted corrected FGA demand of the probable overstock product in the sales region: to integrate the corrected FGA demand into a direct sales planning system for automated resource allocation across the sales region.

13. The machine-readable medium of claim 12, wherein the computing device is deployed at a retailer site associated with the retail partner, the retailer site being in the sales region.

14. The machine-readable medium of claim 12, wherein the process further comprises initiating a transfer of the probable overstock product from the retail partner to an FGA stock warehouse in the sales region.

* * * * *